June 26, 1923.
F. J. MUECK
1,459,740
VEHICLE BODY
Filed Sept. 22, 1922
2 Sheets-Sheet 2
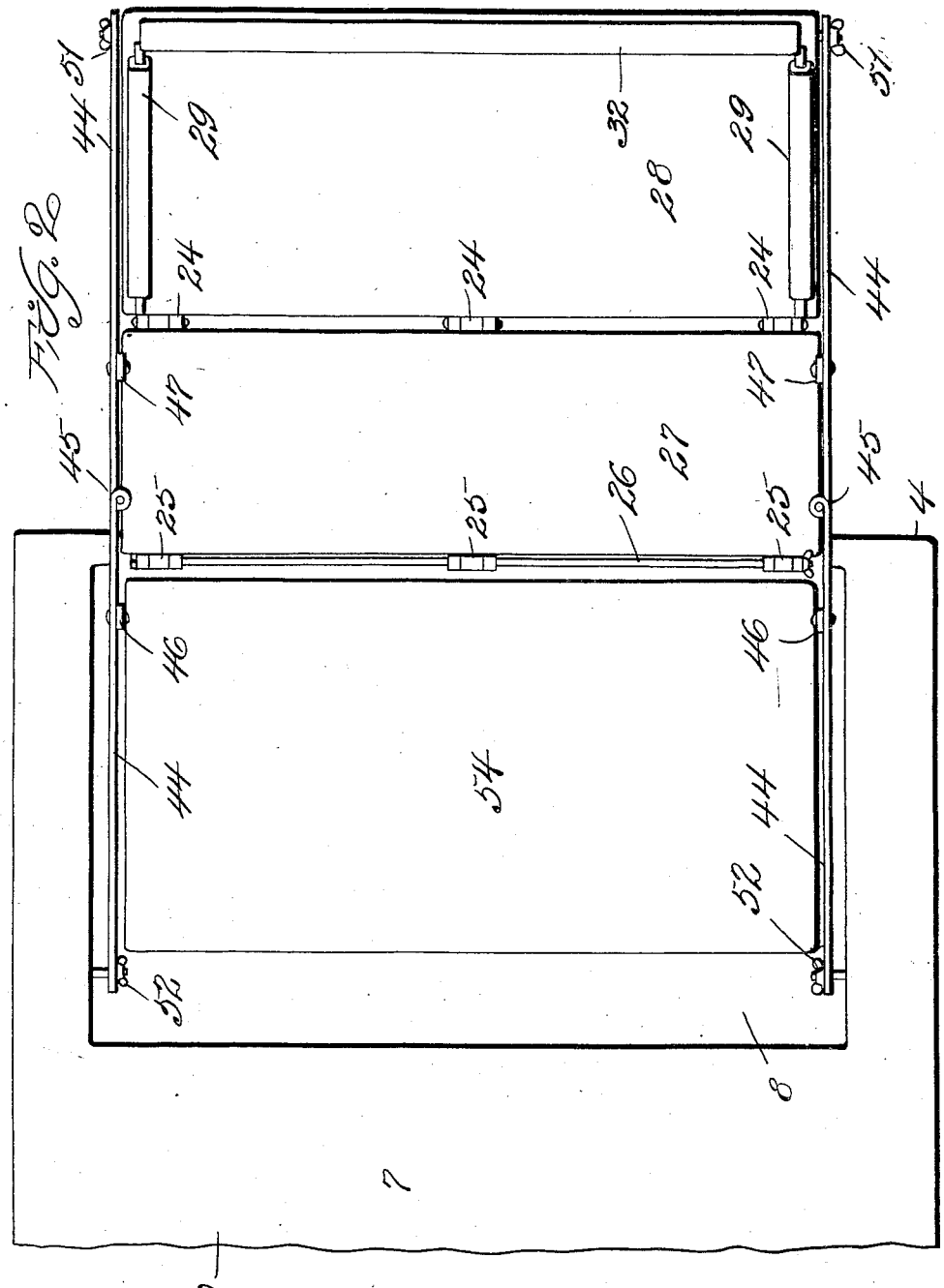
INVENTOR FRANK J. MUECK,
by Arthur C Eckert ATTORNEY.

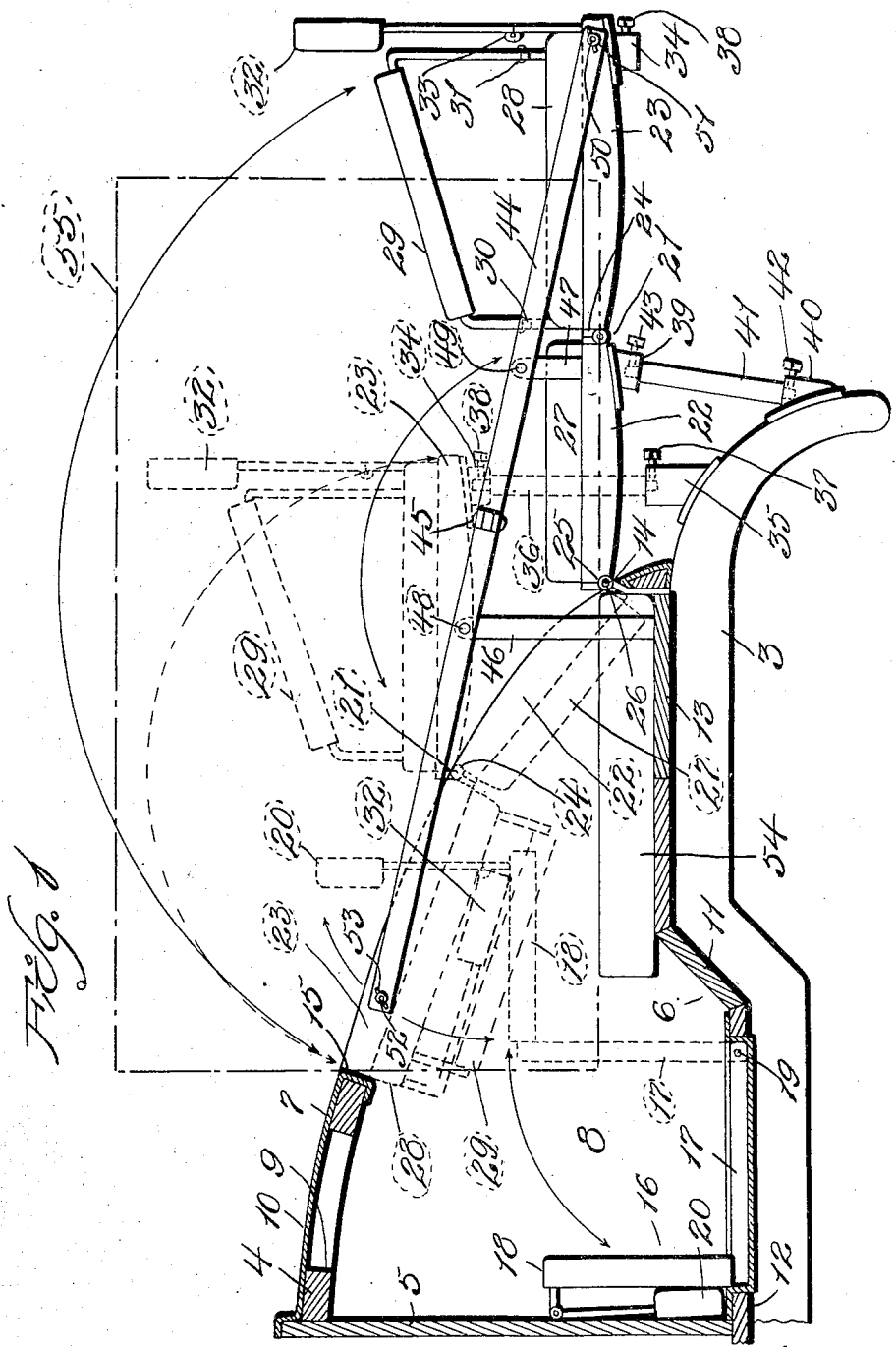

Patented June 26, 1923.

1,459,740

UNITED STATES PATENT OFFICE.

FRANK J. MUECK, OF ST. LOUIS, MISSOURI, ASSIGNOR TO THE MUECK AUTO BODY COMPANY, OF ST. LOUIS, MISSOURI, A CORPORATION OF MISSOURI.

VEHICLE BODY.

Application filed September 22, 1922. Serial No. 590,214.

*To all whom it may concern:*

Be it known that FRANK J. MUECK, a citizen of the United States of America, residing at St. Louis, State of Missouri, has invented certain new and useful Improvements in Vehicle Bodies, of which the following is a specification.

The object of my invention is to make a vehicle body, in which the tonneau may be used in providing auxiliary seats, a bed, and a truck box or body. A further object is to make the seats collapsible so that when not in use they must be folded into the tonneau as well as making the bed collapsible so that it can be likewise folded into the tonneau.

A further object is to so fabricate the auxiliary seats that they can be applied to the tonneau of an automobile of for instance the sport model type, which will be made of standard parts, easily assembled, which can be easily and quickly taken from a using to a non-using position and which when in a non-using position will be entirely concealed from view.

With this and other objects in view my invention has relation to certain novel features of construction and arrangement of parts as will be hereinafter more fully described, pointed out in the claims and illustrated in the drawings in which—

Fig. 1 is a side elevation of my device showing the fragmentary body portion in section with the bed and seats in their extended or using positions, and Fig. 2 is a plan view of Fig. 1 showing the bed in extended position.

Numeral 3 designates the rear portion of the chassis of a vehicle preferably an automobile, and numeral 4 the rear portion or tonneau of the body of said vehicle. Within the body or tonneau portion between the vertical member 5, the floor 6 and the top 7 is formed the space 8 within which my auxiliary seats and bed may be folded when the seats and bed are in non-using position. Numeral 9 designates the conventional body construction with the cover 10. In the floor 6 is formed the offset or inclined plane 11 which divides the floor 6 into two parallel portions 12 and 13. Thus far I have described the conventional body construction which usually has a lid or cover rotatively secured at 14 formed of one piece and locking at 15 which simply provides a closure means for the space 8, which space 8 is used for a luggage carrier.

I have provided the jump seat 16 which consists of the vertical standard 17 with the seat 18 formed thereon at right angles. The vertical standard 17 is rotatively secured to the floor portion 12 at 19. To the rear of the seat 18 is pivotally secured the back 20. When the jump seat is in using position, when the space between the points 14 and 15 is clear, it is positioned as shown by the dashed lines in Fig. 1. When it is desired to place the jump seat in non-using position the back 20 is folded down on to the seat 18 and the vertical standard 17 is rotated as shown by the arrows in Fig. 1 in an anticlockwise direction until it is in the position shown in solid line adjacent the vertical member 5 in Fig. 1. The cover plate for the opening between 14 and 15 has its outer surface of the contour shown by the solid line between the points 14 and 15 but is broken at the point 21 thereby being divided in the two portions 22 and 23, which portions are hinged together by the hinge 24. At the lower end of the portion 22 is formed the eye 25 through which is positioned the rod 26 which rod 26 is removable, but which when in position permits rotating the portions 22 and 23 on it. The under sides as shown in Fig. 1 of the portions 22 and 23 have cushions 27 and 28 formed thereon. The portion 23 has formed on its sides the arms 29 which are hingedly secured to the cushion 28 or the frame beneath it by the hinges 30 and 31. The back 32 is hingedly secured at 33 as best shown in Fig. 1. When the arms 29 are folded down on to the cushion 28 and the back 32 is folded down over the arms 29, the arms and back will take the position shown in dashed line under the portion 23. When it is desired to supply additional seats other than the jump seat previously described, the portion 23 is rotated in a clockwise direction around the point 24 to the position shown in Fig. 1 which provide the seats when the arms 29 and the back 32 are extended as shown in Fig. 1. In order to support the seats just described, sockets 34 are secured underneath them on both sides and similar sockets 35 are formed on the chassis. A rod 36 of proper length has its ends positioned in the sockets 34 and 35 as best shown in Fig. 1.

Set screws 37 and 38 are provided in the sockets 34 and 35 for securing the rod 36 in said sockets. The rods 36 form the supports for the seats.

When it is desired to use the bed portion of my device, the portion 22 is rotated about the point 14 until the seats just described take the position of the seats at the right hand side of Fig. 1 shown in solid line. The cushion 27 is then positioned in a horizontal plane as shown in solid line. Sockets 39 and 40 are formed on the outer surface of the portion 22 and the chassis respectively as shown by solid lines in Fig. 1. Numeral 41 designates a rod which has its ends secured in the sockets 39 and 40. 42 and 43 designate set screws for securing rod 41 in the sockets 39 and 40. Numeral 44 designates a rod made of two portions hingedly secured at 45 and having the arms 46 and 47 pivotally secured thereto at 48 and 49. These rods 44, for there is one at each side, are stiffening or antibuckling members which are secured to the right hand seat at 50 by the winged-nuts 51 and to the body portion at 52 by the winged nuts 53. The arms 46 and 47 rest as shown in Fig. 1 when in using position. In non-using position these arms are rotated parallel to the rod 44 and the rod portions are secured flat against each other by rotation at the hinged portion 45. Numeral 54 designates a cushion which is loosely positioned on the floor 13 so that the bed portion will include this cushion together with the cushion 27 and the cushion 28. The arms 29 and the back 32 form side rails and a back for the bed when in using position. Numeral 55 designates a box or luggage carrier which can be used when it is desired to use the vehicle as a truck. When this is done the portions 22 and 23 are removed by unlocking at 15 and removing the rod 25 and positioning the box 55 as shown in dashed lines in Fig. 1.

What I claim and mean to secure by Letters Patent is:

1. In combination with a hollow tonneau, a closure for said tonneau composed of parts rotatively secured together, said closure rotatively secured to said tonneau at its one extremity, means of selectively securing the closure of said tonneau in a horizontal position external to said tonneau.

2. In combination with a hollow tonneau having an opening therein, a closure for the opening in said tonneau pivotally secured to said tonneau at its one extremity, means of selectively securing the closure of said tonneau in a horizontal position external to said tonneau, said closure comprising seats pivotally secured together, so that in the extended position of said closure said seats together with the floor of the hollow portion of said tonneau will form a bed.

In testimony whereof I affix my signature.

FRANK J. MUECK.